B. PARMITER & W. BRADLEY.

Vehicles.

No. 145,965. Patented Dec. 30, 1873.

Witnesses. Inventors.
Benjamin Parmiter
William Bradley

UNITED STATES PATENT OFFICE.

BENJAMIN PARMITER AND WILLIAM BRADLEY, OF MORGAN COUNTY, OHIO.

IMPROVEMENT IN VEHICLES.

Specification forming part of Letters Patent No. 145,965, dated December 30, 1873; application filed April 25, 1872.

*To all whom it may concern:*

Be it known that we, BENJAMIN PARMITER and WILLIAM BRADLEY, of the county of Morgan and the State of Ohio, have invented certain Improvements in Platform Spring-Vehicles, of which the following is a specification:

It is the object of our invention, when constructed, arranged, and adjusted as hereinafter described, reference being had to the accompanying drawings, that the weight or burden placed in the bed of the vehicle for transportation will operate equally and uniformly upon both the front and rear springs, whether level or undulating be the roads.

Our invention consists in certain details of arrangement of two side springs and a back spring in the rear, and two side springs and a front spring in the front of the vehicle, the junction of the latter springs being connected to the cross-bar and to the front axle by inflexible bars having pivoted joints, as hereinafter more fully described.

To enable others skilled in the art to understand our invention, we will proceed to describe the manner in which we have carried it out.

Figure 1:
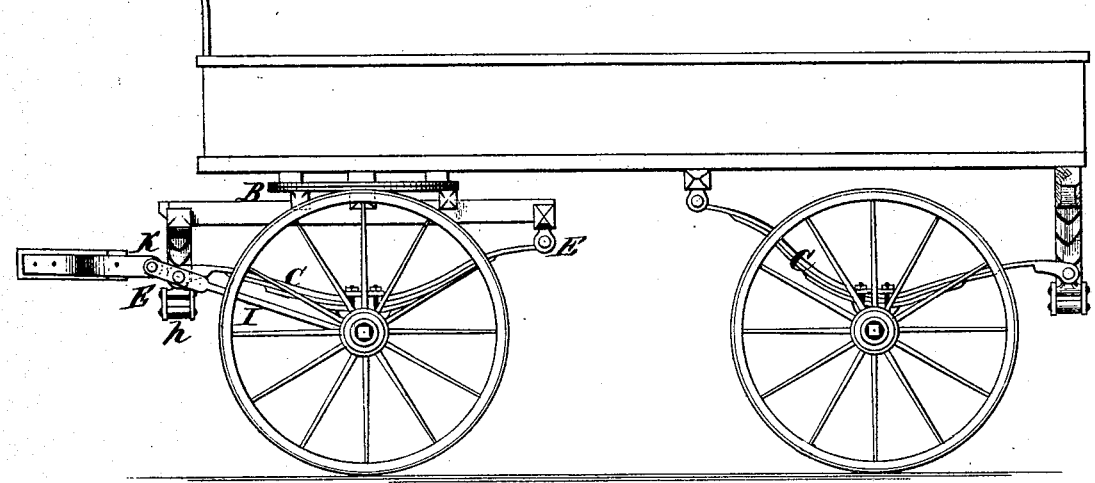
Figure 2:
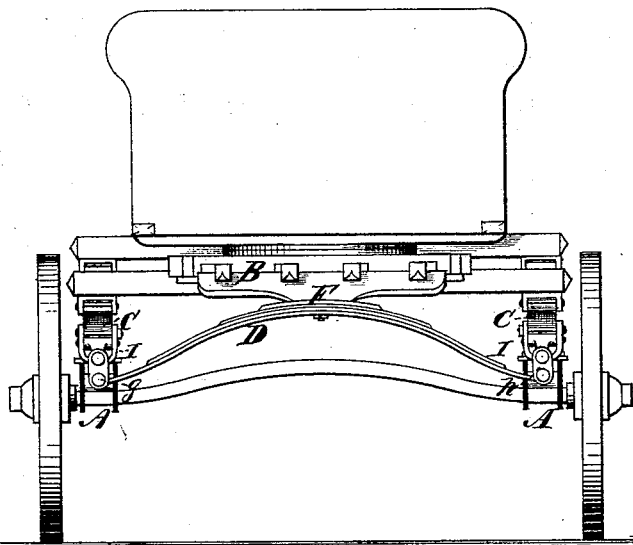

Figure 1 represents a side view of a vehicle embodying our invention. Fig. 2 represents a front-end view of the same.

A A represent the points of the front axle at which the side springs are attached. B represents the platform-frame, to which the bed is attached by means of bolt or other device, and to which said platform-frame is also attached the front side spring. C C represent the side springs of the front part of said vehicle, attached at the rear points to the cross-bar of the platform-frame B, by means of stirrups or bolts or other device, at E E. D represents the front cross-spring, attached to the said platform-frame B in front and center, at F, and also attached to side springs C C, at ends $g$ and $h$, by means of swivels. I represents the said shafts, with slotted flanges, attached to the said front axle or spring-blocks, at $a\ a$, by means of bolts and eyes or other device, and attached to points $h$ of said side springs C C by means of slotted flanges and bolts L. Said slots are used in said flanges, so that the said side springs may act and react without being bound by shafts J. K represents the cross-bar for the tongue or shafts to be attached to at the ends of slotted flanged shafts I by means of bolts or other device.

We claim—

The frame B, side springs C C, and cross-spring D, in combination with the slotted rigid bars I I and cross-bar K, as set forth.

BENJAMIN PARMITER.
WILLIAM BRADLEY.

Witnesses:
BENJAMIN F. POWER,
JAS. M. GAYLORD.